(12) United States Patent
Schmidt

(10) Patent No.: US 9,418,168 B2
(45) Date of Patent: Aug. 16, 2016

(54) PROVIDING CLOUD-BASED, GENERIC ODATA MASHUP SERVICES USING AN ON-DEMAND SERVICE

(71) Applicant: Olaf Schmidt, Walldorf (DE)

(72) Inventor: Olaf Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 14/065,912

(22) Filed: Oct. 29, 2013

(65) Prior Publication Data

US 2015/0120701 A1 Apr. 30, 2015

(51) Int. Cl.
*G06F 17/30* (2006.01)

(52) U.S. Cl.
CPC ...... *G06F 17/3089* (2013.01); *G06F 17/30424* (2013.01); *G06F 17/30893* (2013.01)

(58) Field of Classification Search
CPC .................... G06F 17/30424; G06F 17/30893
USPC ......................................................... 707/722
See application file for complete search history.

(56) References Cited

U.S. PATENT DOCUMENTS

| | | | |
|---|---|---|---|
| 7,707,176 B2 | 4/2010 | Schmidt | |
| 7,844,890 B2 | 11/2010 | Schmidt | |
| 7,941,546 B2 | 5/2011 | Rice et al. | |
| 7,956,276 B2* | 6/2011 | Sako | H04N 21/6547 84/609 |
| 7,975,013 B2 | 7/2011 | Schmidt | |
| 8,090,754 B2 | 1/2012 | Schmidt et al. | |
| 8,127,237 B2 | 2/2012 | Beringer | |
| 8,219,974 B2 | 7/2012 | Schmidt | |
| 8,296,409 B2 | 10/2012 | Banerjee et al. | |
| 8,321,792 B1 | 11/2012 | Alur et al. | |
| 2008/0154977 A1 | 6/2008 | Schmidt | |
| 2008/0263007 A1 | 10/2008 | Schmidt | |
| 2009/0150168 A1 | 6/2009 | Schmidt | |
| 2009/0150431 A1 | 6/2009 | Schmidt et al. | |
| 2009/0150866 A1 | 6/2009 | Schmidt | |
| 2009/0150906 A1 | 6/2009 | Schmidt et al. | |
| 2009/0248741 A1* | 10/2009 | Singh | G06F 9/4425 |
| 2009/0271474 A1* | 10/2009 | Fu | G06Q 10/10 709/202 |
| 2010/0036814 A1* | 2/2010 | Kalasapur | G06F 17/3089 707/708 |
| 2010/0125623 A1* | 5/2010 | Rice | H04L 67/2814 709/202 |
| 2010/0125826 A1* | 5/2010 | Rice | G06F 17/30867 717/107 |
| 2010/0199169 A1* | 8/2010 | Gnech | G06F 17/30893 715/234 |
| 2010/0287553 A1 | 11/2010 | Schmidt et al. | |
| 2011/0066563 A1* | 3/2011 | Jagadeesan | G06Q 10/06 705/317 |
| 2011/0131194 A1* | 6/2011 | Ma | G06F 17/30899 707/705 |

(Continued)

OTHER PUBLICATIONS

U.S. Appl. No. 13/543,254, Olaf Schmidt, filed Jul. 6, 2012.

(Continued)

*Primary Examiner* — Joshua Bullock
(74) *Attorney, Agent, or Firm* — Fish & Richardson P.C.

(57) ABSTRACT

The present disclosure describes methods, systems, and computer program products for providing cloud-based, generic OData mashup services. One computer-implemented method includes parsing a received a request for service-related data to determine a subject mashup service associated with the request, retrieving a subject mashup service definition from a service repository, retrieving subservice definitions associated with the subject mashup service definition, instantiating subservices with a computer using the subservice definitions, and transmitting a request to retrieve the service-related data from the instantiated subservices.

21 Claims, 6 Drawing Sheets

(56) References Cited

U.S. PATENT DOCUMENTS

| | | |
|---|---|---|
| 2011/0231592 A1* | 9/2011 | Bleier .................. G06F 9/54 710/305 |
| 2011/0296476 A1* | 12/2011 | Rouse .............. H04N 21/23412 725/109 |
| 2011/0321058 A1 | 12/2011 | Schmidt |
| 2012/0042216 A1 | 2/2012 | Blubaugh |
| 2012/0246130 A1 | 9/2012 | Schmidt |
| 2012/0324069 A1 | 12/2012 | Nori et al. |
| 2013/0018926 A1 | 1/2013 | Schmidt et al. |
| 2013/0159378 A1 | 6/2013 | Misovski et al. |
| 2013/0159897 A1 | 6/2013 | Misovski et al. |
| 2013/0159984 A1 | 6/2013 | Misovski et al. |
| 2013/0159993 A1 | 6/2013 | Misovski et al. |
| 2013/0290880 A1 | 10/2013 | Wu et al. |

OTHER PUBLICATIONS

U.S. Appl. No. 13/575,158, Olaf Schmidt et al., filed Feb. 1, 2013.
U.S. Appl. No. 13/738,686, Olaf Schmidt, filed Jan. 10, 2013.
U.S. Appl. No. 13/910,461, Olaf Schmidt et al., filed Jun. 5, 2013.
U.S. Appl. No. 13/931,103, Olaf Schmidt, filed Jun. 28, 2013.
U.S. Appl. No. 14/027,918, Olaf Schimidt, filed Sep. 19, 2013.

* cited by examiner

```
                                                    300
                                                    ↙
         <service>
    304     <service_name>FLIGHT_MASHUP</service_name>
    302     <ext_service_name>flightmashup</ext_service_name>
    306     <namespace>CUSTOM</namespace>
            <version>0001</version>
    308     <latest_version>0002</latest_version>
    310     <mpc>com.xyz.gateway.core.mashup.md.MashupEdmProvider</mpc>
    312     <dpc>com.xyz.gateway.core.mashup.dp.MashupProcessor</dpc>
         </service>
```

FIG. 3

```
                                                    500
                                                    ↙
    <context-param>
        <param-name>MashupRepositoryProvider</param-name>
        <param-value>com.xyz.gateway.core.mashuprepo.MashupSrvRepoProvider</param-value>
    </context_param>
```

FIG. 5

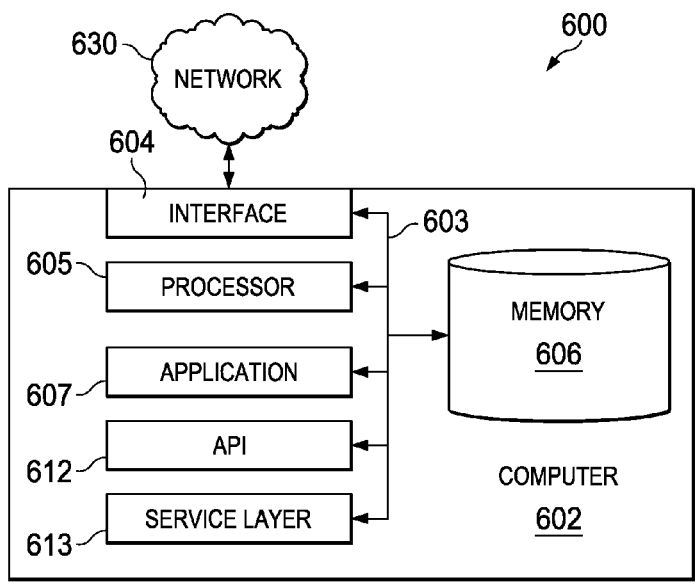

FIG. 6

```xml
<?xml version="1.0" encoding="UTF-8"?>
<services>
  <service>
    <service_name>FLIGHT_MASHUP</service_name>
    <namespace>CUSTOM</namespace>
    <version>0001</version>
    <latest_version>0002</latest_version>

<subservices>
       <subservice>  ~ 402a
          <service_name>FLIGHT</service_name>
          <namespace>IWFND</namespace>  ~ 404a
          <version>0001</version>  ~ 406a
          <latest_version>0002</latest_version>  ~ 408a
          <model_id>/IWFND/FLIGHT_0001_BE</model_id>                           410a
          <destination>GND</destination>
          <service_factory>com.xyz.gateway.core.mashup.sample.BEPSubServiceFactory</service_factory>
       </subservice>

<subservice>  ~ 402b
          <service_name>AIRPORTS</service_name>
          <namespace>IWFND</namespace>
          <version>0001</version>
          <latest_version>0003</latest_version>
          <model_id>/IWFND/AIRPORTS_0001_BE</model_id>
          <destination>GIQ</destination>
          <service_factory>com.xyz.gateway.core.mashup.sample.BEPSubServiceFactory</service_factory>
       </subservice>

<subservice>  ~ 402c
          <service_name>BOOKINGS</service_name>
          <namespace>IWFND</namespace>
          <version>0001</version>
          <latest_version>0002</latest_version>
          <model_id>/IWFND/BOOKINGS_0001_BE</model_id>
          <destination>GMD</destination>
          <service_factory>com.xyz.gateway.core.mashup.sample.BEPSubServiceFactory</service_factory>
       </subservice>

</subservices>
  <service>
</services>
```

PROVIDING CLOUD-BASED, GENERIC ODATA MASHUP SERVICES USING AN ON-DEMAND SERVICE

BACKGROUND

In mobile device web development, a mashup is an application, for example a client or a cloud-based hosted application, that combines and uses source data, presentation, and/or functionality (resources) from two or more sources to create new services offering enriched resources. The main characteristics of a mashup are combination, visualization, and aggregation and imply easy, fast integration, frequently using open application programming interface (API)s and/or data sources to produce the enriched resources even if not necessarily the original reason for producing the source resources. While making existing data more useful, mashup implementations are typically non-generic, that is they are specifically designed for an intended purpose and require particularly implemented interfaces, support, and maintenance due to their design. Non-generic mashups provide little in the way of reuse and increase a total cost of ownership when using mashups.

SUMMARY

The present disclosure relates to computer-implemented methods, computer-readable media, and computer systems for providing cloud-based, generic Open Data Protocol (OData) mashup services. One computer-implemented method includes parsing a received a request for service-related data to determine a subject mashup service associated with the request, retrieving a subject mashup service definition from a service repository, retrieving subservice definitions associated with the subject mashup service definition, instantiating subservices with a computer using the subservice definitions, and transmitting a request to retrieve the service-related data from the instantiated subservices.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the subject mashup service is instantiated by a generic entity data model (EDM) provider.

A second aspect, combinable with any of the previous aspects, further comprising the generic EDM provider transmitting a request to a mashup service repository for a service definition of the subject mashup service.

A third aspect, combinable with any of the previous aspects, further comprising formatting a service document responsive to the request for service related data, the service document formatted from entity types returned in response to the request to retrieve the service-related data from the instantiated subservices.

A fourth aspect, combinable with any of the previous aspects, further comprising instantiating a mashup processor following the instantiation of the subservices associated with the subject mashup service.

A fifth aspect, combinable with any of the previous aspects, further comprising transmitting a request to the mashup processor for a read feed using a received entity type returned in response to the request to retrieve the service-related data from the instantiated subservices.

A sixth aspect, combinable with any of the previous aspects, further comprising creating a read feed response responsive to the request for service-related data.

The subject matter described in this specification can be implemented in particular implementations so as to realize one or more of the following advantages:

- Exposing a mashup result as an OData service, by combining several data sources as subservices.
    - Consuming enterprise resource planning (ERP) Data from a customer on-premise system.
    - Consuming data from external web services based on public application programming interface (API)s.
    - Data from different data sources can be exposed in a structured way by using, for example, OData. The data retrieved from those data sources can be mapped to the defined data model of the OData service.
- Linkage of sub-services via "Model Composition."
- The linkage allows the navigation between the entities provided by different subservices, where each subservice has its own data model. An example would be the navigation between a service which provides flight information to airports provided by another service where the two service are mashed to one combined service. This would allow queries such as "give me the geo-locations where planes of a particular carrier take off during a certain period of time."
- Mapping and delegation of requests to sub-services as-needed for "Model Composition." In a mashup scenario the data model of the mashup service is defined in terms of the combination of the models of the subservices, where the subservices can access different data sources (e.g., customer on-premise systems, public services, etc.). The mashup framework takes care of retrieving metadata and runtime data from the corresponding subservices by delegating requests to the corresponding subservices. For example, if a geo-location OData service is combined with another OData service to a mashup service where the subservices are exposed by different systems, the mashup framework dispatches/delegates the request according to the incoming request in order to retrieve the requested data from the subservices.
- Reuse of MGS service providers in multiple mashup scenarios.
- Customers invest time and money for the development of OData and other services fulfilling their business needs. Existing services can be reused for mashup scenarios by configuration only. The business logic doesn't need to be re-implemented in order to be utilized in mashup scenarios.
- Definition of mashup services by configuration.
- Provisioning of open APIs for the integration of custom sub-service providers.
- When customers want to utilize data from external services (e.g., FACEBOOK) they can implement a custom data access service. This custom implementation can be integrated in mashup scenarios by using provided APIs.

Different types of mashups can be realized with the mashup infrastructure of MGS. For example:

Business (or enterprise) mashups define applications that combine their own resources, application and data, with other external web services. Enterprise mashups are secure services that expose actionable information from diverse internal and external information sources.

Consumer mashups combines data from multiple public sources (GOOGLE MAPS, FACEBOOK, . . . )

Data mashups combine similar types of media and information from multiple sources into a single representation. The combination of these resources creates a new and distinct service that was not originally provided by either source.

Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 illustrates an example mashup service definition according to an implementation.

FIG. 4 illustrates an example mashup service subservice definition according to an implementation.

FIG. 5 illustrates an example parameter in an XML document used to instantiate a mashup service repository provider according to an implementation.

FIG. 6 is a block diagram of an exemplary computer used in the EDCS according to an implementation.

Like reference numbers and designations in the various drawings indicate like elements.

DETAILED DESCRIPTION

Figure 1:
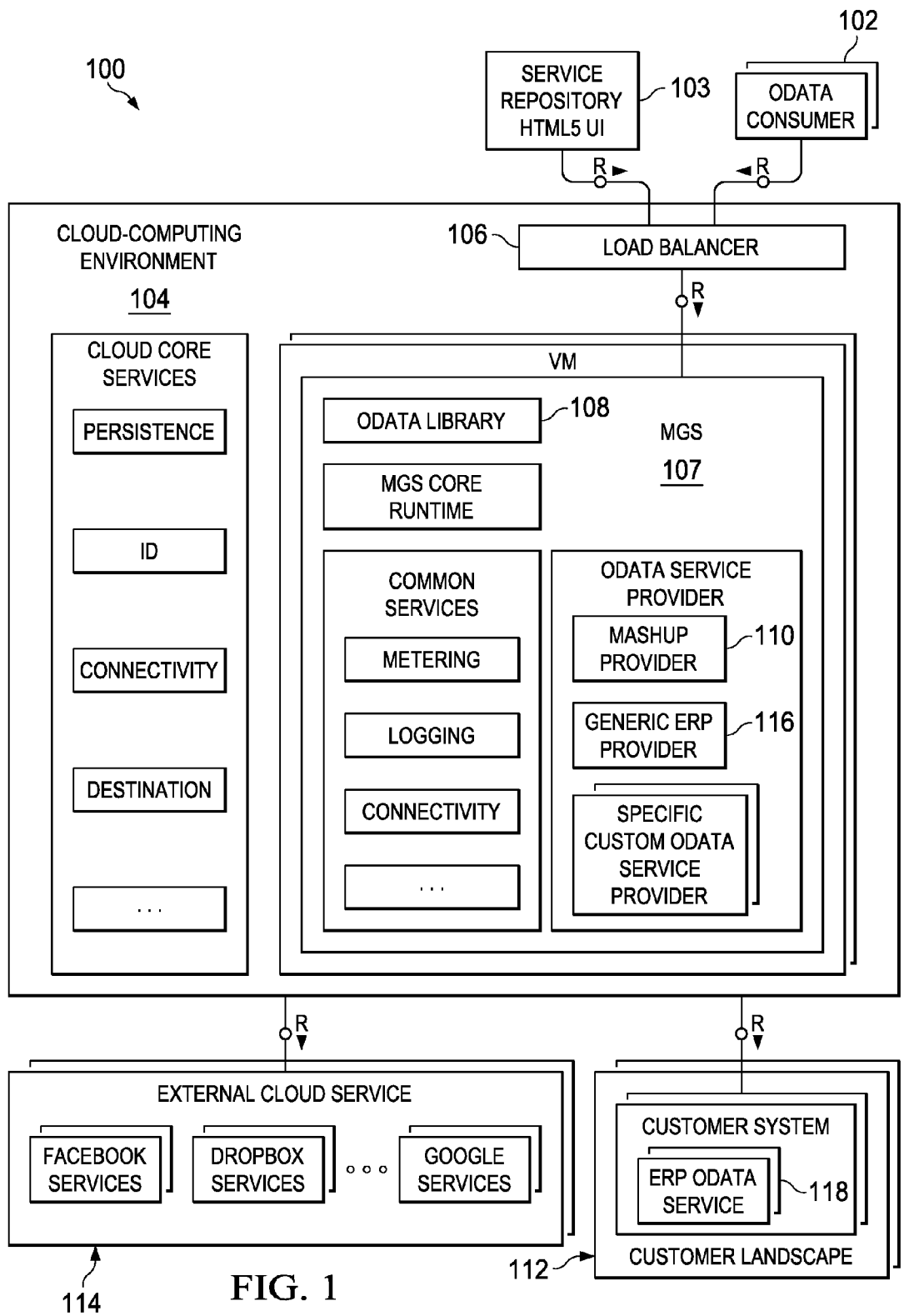
FIG. 1 is a high-level block diagram of an example distributed computing system (EDCS) for providing cloud-based, generic OData mashup services according to an implementation.

This disclosure generally describes computer-implemented methods, computer-program products, and systems for providing cloud-based, generic OData mashup services. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Open Data Protocol (OData) is a web protocol for querying and updating data over networks and allows for a user to request data from a data source over the Hypertext Transfer Protocol and receive results back from the data source in formats such as Atom Publishing Protocol (Atom), JAVASCRIPT Object Notation (JSON), and Extensible Markup Language (XML), etc. The OData protocol is increasingly used by mobile computing and other computing platforms, such as smartphones and tablet computers, as an important method of access to information over networks.

Mobile computing platforms (i.e., clients) may access cloud-based or other hosted applications, for example customer on-premises business applications/services, through a gateway server. The gateway server provides a gateway service with a defined application programming interface (API) or other interface and acts as a gateway-type hub between a client and applications. The provided gateway service allows easier provisioning and consumption of business logic and content of application/service backend systems as well as other data sources. In other words, the gateway server provides user-centric application access/support for client applications running on various devices and UI-technologies (e.g., smartphones, tablet computers, HTML5 clients, etc.) to access customer applications/services.

In some implementations, the gateway server can communicate with clients and/or applications/services using OData through hypertext transfer protocol (HTTP) or hypertext transfer protocol secure (HTTPS) requests and receive XML/JSON formatted documents. In some implementations, the gateway server can use a remote function call (RFC) interface to communicate with applications/services. As will be appreciated by those skilled in the art, the use of OData, HTTP(S), RFC, XML/JSON, and the like can be substituted for other protocols, computer languages, etc. The exemplary use of a protocol, computer language, etc. in this disclosure is not meant to be limiting in any way. Other appropriately formatted requests in any protocol and/or computer language are also considered to be within this scope of this disclosure.

In some implementations, a gateway server and/or associated components can be stand-alone and/or incorporated into any component of a distributed computing system. In some implementations the gateway server and/or associated components may be one or more hardware servers, software servers, and/or virtual servers. In some implementations, the gateway server and/or associated components can be part of a web server, a streaming server, an RSS server, or other suitable server.

The following disclosure describes a sub-system of an implementation of a mashup-enabled gateway service (MGS) running in a cloud-based computing environment and providing generic mashup services, although the sub-system can, in some implementations, run in a non-cloud-based computing environment. This sub-system provides functionality to expose enterprise-ready mashup services where the MGS can be connected to on-premise customer systems and external cloud services. The mashup services are defined by configuration and providing reusable sub-service providers based on an open mashup application programming interface (API). Customers and external cloud service providers have complete control and auditability of what is technically exposed to the on-demand world.

Connections of an application can be configured using connectivity destinations specific to a customer's environment allowing to definition of connections to either on-premise systems in the customer system landscape or to public cloud services (e.g., GOOGLE—geo locations, FACEBOOK, DROPBOX, etc.) by using mechanisms of a cloud-based computing platform. In this case a symbolic alias is maintained for a particular connectivity (or several connectivity) used by the services of a customer. In addition to the symbolic names authorization mechanisms for utilizing a particular connectivity can also be maintained (e.g., using Basic Authentication, Single Sign On, etc.). The services use the symbolic names defined during connectivity configuration as a "destination" tag in the service definition (e.g., stored in/referred to by a service repository). The destination correlates to connectivity destination. Connectivity to external web/cloud-based services can also be configured.

The mashup infrastructure of the MGS allows mashing up of multiple services. Therefore services and model implementations for services (e.g., an OData service in an on-premise system implementing a data model) can be reused for other use cases. Two or more services can be composed by configuration to form a completely new service without having to change the existing services. During runtime the mashup infrastructure delegates sub-service requests to corresponding sub-service providers and aggregates results to return to a requestor. Model composition is also provided for complex scenarios. During model compositions several previously defined services (and the corresponding data models) can be combined to a more complex model (service) by using the existing services in the context of a new service without the need to add additional coding (configuration only).

FIG. 1 is a high-level block diagram of an example distributed computing system (EDCS) 100 for providing cloud-based, generic OData mashup services according to an implementation. At a high-level, an OData consumer (e.g., client) 102 can access a MGS-capable cloud-computing environment 104. In typical implementations, a generic OData mashup service request (hereinafter "mashup request") is received from the client 102 and handled by a load balancer 106 that determines which of a plurality of virtual MGS instances 107 (or "gateway frameworks") is least loaded and can be allocated to handle the received client 102 mashup request. The mashup request is then transmitted to a particular MGS instance 107 where it is processed by an OData Library 108 and then a mashup provider 110 (see FIG. 2 for additional detail). The MGS instance 107 then requests appropriate data associated with the mashup request from one or more of a customer application/service 112 (in a particular customer landscape) and/or external cloud services 114. Data is returned to the MGS instance 107, appropriately processed, and returned to the client 102. In some implementations, a service repository 103 user interface application can provide a "catalog" of available services (names and descriptions), including mashup services, available through the MGS instances 107. A developer can browse the catalog and choose appropriate services to use with an application under development. A generic ERP provider 116 supports generic exposure of existing OData services 118 in on-premises backend systems. In some implementations, the service repository can also contain OData services which assess other data sources than customer on-premise systems. These are custom OData services which can be implemented by using MGS APIs.

Figure 2:
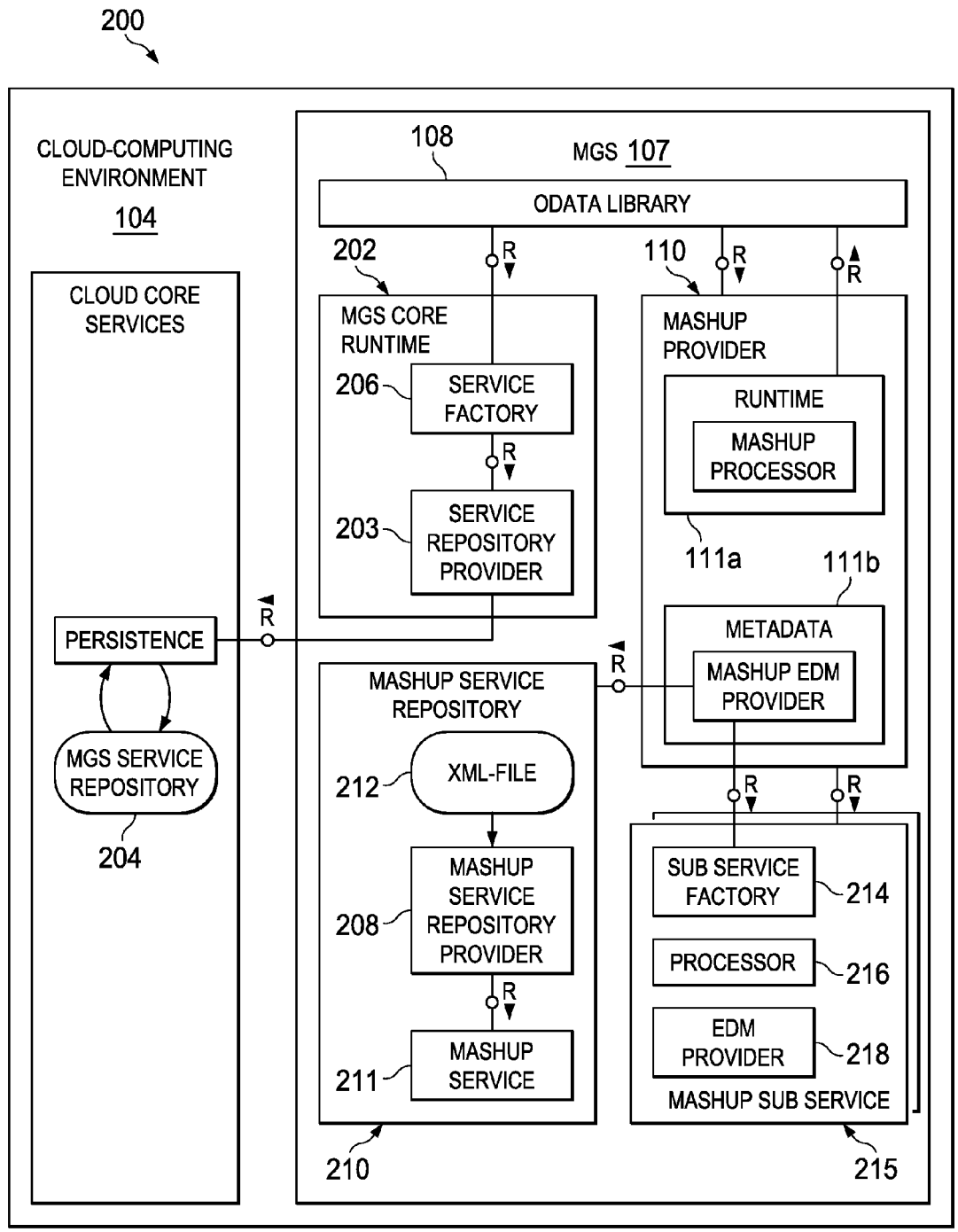
FIG. 2 is a lower-level block diagram of the EDCS focusing on the architecture of the mashup provider and associated components according to an implementation.

FIG. 2 is a lower-level block diagram 200 of the EDCS 100 focusing on the architecture of the mashup provider 110 and associated components according to an implementation. In some implementations, the OData library 108 is a component library for building OData producers in JAVA or other computer language. The OData library 108 provides serialization and parsing functionality for URLs and/or data structures (e.g., XML, JSON, etc.). The MGS core runtime 202 provides functionality to look up services in a persistent service repository 204, for example stored in an in-memory or conventional database, flat file (e.g., XML), or other appropriate type of storage. The MGS core runtime 202 also instantiates corresponding OData Processor and EDM Provider. The EDM Provider provides metadata documents describing an entity data model (EDM) for a given service—the underlying abstract data model used by OData services to formalize the description of the resources it exposes. Each Entry of an OData feed is described in the EDM by an Entity Type based on a maintained data provider class and model provider class information provided for a requested OData service (service factory). More particularly, the EDM is a set of concepts that describe the structure of data, regardless of its stored form. For example, OData metadata documents can describe the EDM for a given service. A MGS core connector factory (not illustrated), as part of the MGS core runtime 202, allows lookups of configured backend connections (e.g., to customer application/service 112 (in a particular customer landscape) and/or external cloud services 114 as illustrated in FIG. 1) using a connectivity and destination service (refer to FIG. 1 under cloud core services).

The mashup provider 110 supplies core functionality for providing cloud-based, generic OData mashup services and is made up of several components, each of which allow the definition of mashup-services in a dedicated mashup service repository, for example the MGS service repository 204. The mashup provider 110 includes a runtime (mashup processor) 111a and a metadata (EDM provider) 111b providing data and data structure, respectively, responsive to a received mashup service request.

A mashup service is identified by the MGS core runtime 202 in a manner identical to identification of "general" gateway services. A mashup service is identified by two request path-segments (namespace and service name) and a matrix parameter which specifies a version. This is the same as for "general" gateway services. This information (e.g., namespace, service-name and version) are the lookup-key for the corresponding service entry in the service repository (203/204). The MGS core runtime 202 looks up the corresponding service repository entry based on the parsed lookup-key (e.g., namespace, service-name and version). For a mashup service, a generic mashup service provider 110 is registered in the service repository entry. The generic service repository provider 203 is called by the MGS instance 107 with the lookup-key information. The generic mashup service provider 110 uses the lookup-key to do a lookup in the mashup service repository 210 providing mashup services. Note that the illustrated XML file 212 is an example for a persistence type of a repository. Any appropriate repository, for example a database, data structure, etc. in any format is considered to be within the scope of this disclosure. As a result of this lookup, the generic mashup service provider 110 can identify the correct mashup subservice factory (e.g., entity 214 in FIG. 2) needed for the instantiation and initialization of the actual mashup service provider (EDM Provider—entity 218 in FIG. 2—and processor—entity 216 in FIG. 2). This mashup service provider (entity 211 in FIG. 2) for a particular mashup service (e.g., FLIGHTMASHUP), is responsible for the actual request processing, such as retrieval of service metadata and runtime data. The mashup service provider (label 110) delegates requests to the correct sub-service providers (e.g., entity 215 in FIG. 2) for generating the overall metadata and service document as well as for the runtime data of a particular feed (collection) exposed by this sub-service. Note that the mashup-service interacts with several subservices 215 depending on the configuration of the currently instantiated mashup service (declared in the mashup service repository 210). There is a difference between the generic mashup service provider 110 and the actual mashup service provider 211, which is implemented for a particular mashup service. The generic mashup service provider 110 hides all mashup details from the MGS instance 107. Until the control is handed over to the generic mashup service provider 110, the processing is handled from the framework's perspective in a manner similar to a non-MGS.

FIG. 3 illustrates an example mashup service definition 300 according to an implementation. Although illustrated in XML, any appropriate computer language can be used to represent the mashup service definition. A namespace is an abstract container for types in a data model. Namespaces in OData are similar to namespaces in a programming language—they provide context for the objects that they contain and provide a way to disambiguate objects that have the same name (but are contained in different namespaces). Note, use of similar data types, structures, etc. in other computer languages/protocols is considered within the scope of this disclosure. Namespace 302 and the external service name 304, "CUSTOM" and "flightmashup," respectively, are used to identify a request to be handled by the "FLIGHT_MASHUP" service.

The FLIGHT_MASHUP service also includes a version 306 and latest_version 308 definition. The version 306 definition provides the version of the particular FLIGHT_MASHUP service while the latest_version 308 informs that a later version of the FLIGHT_MASHUP service is available (version 0002) that may provide different functionality. In some implementations, requests to the FLIGHT_MASHUP service without specifying a version will result in use of the later version (e.g., 0002). This default behavior can be overridden by specifying a version parameter in any request URL that is received.

The FLIGHT_MASHUP service also includes a specification for a model provider (MashupEdmProvider) 310 and a data provider (MashupProcessor) 312 that form part of a mashup service provider 110 instance. The model provider 310 provides a metadata document, for example in XML, describing the structure of data returned by the FLIGHT_MASHUP service and associated subservices. The metadata document is a combination of metadata documents returned by all subservices (refer to FIG. 4) associated with the FLIGHT_MASHUP service. The model provider 310 looks up all the associated subservices to the FLIGHT_MASHUP service and combines all the metadata documents into a FLIGHT_MASHUP service metadata document. The data provider 312 is responsible for delivering data corresponding to the structure specified by the model provider 310. The data provider 312 maps the data based on the metadata model description. In this way, a user can parse received data from the data provider 312 using the data structure provided by the model provider 310. In some implementations, the metadata model description returned by the model provider 310 can be requested and processed for every data request. In other implementations, the metadata model description can be requested and unless the underlying data structure changes, the metadata document structure can be reused to parse the data returned by the data provider 312. For example, the metadata document can be requested and used and the version 306/latest version 308 definitions can be monitored for changes. If a change is noticed in versions, either a specific version can be requested or a new metadata document can be requested for comparison and adjustment of data parsing methods.

Returning to FIG. 2, the mashup service definition is stored in the MGS service repository 204 and is accessible through the MGS core runtime 202. In some implementations, an additional service repository is used to store subservice definitions for a mashup service. Once a request for a mashup service is identified by the service factory 206/service repository provider 202, the MGS core runtime 202 (or associated component) accesses the mashup service repository 210 to get additional information (e.g., subservices, etc.) associated with the requested mashup service.

FIG. 4 illustrates an example mashup service subservice definition 400 according to an implementation. Although illustrated as structured in XML, any appropriate computer language can be used to represent the mashup service subservice definition. In the example, the FLIGHT_MASHUP mashup service combines OData services (subservices) for flight information (402a), airport information (402b), and booking information (402c). This combination into the single FLIGHT_MASHUP mashup service permits the generic provision of combined data by configuration and without adding additional code.

Identified FLIGHT_MASHUP subservices are illustrated as 402a-c. For example, the FLIGHT subservice 402a has a particular subservice namespace 404a (similar to the flight mashup service definition), and version/latest_version 406a/408a. The subservice definition also has a service_factory 410a specification. Additionally, the "model_id" is a unique identifier of the model of a OData service implemented in an on-premise gateway infrastructure. In general this is a unique identifier for an existing service that can be reused in a mashup service. The combination of destination (e.g., system—as described above) and model_id uniquely identifies one service. The service_factory 410a specification details which service_factory 410a is to be instantiated for the FLIGHT subservice. The defined service_factory 410 specification instantiates its own EDM provider and processor data provider by retrieving a definition of the "BEPSubServiceFactory" from the cloud core services as illustrated in FIGS. 1 and 2. The processor 216, EDM provider 218 are instantiated for each subservice service_factory specification 410. It is important to note that each subservice 402 can be local and/or distributed services from common and/or different systems. For example, subservice 402a could be an on-premises service, while subservice 402b could be hosted by a third-party search engine provider or a social media provider. In some implementations, the mashup provider 110 requests information from subservices running in a distributed system landscape. Note that all subservices are also defined in the MGS core service repository 204 and can be accessed individually outside of a mashup service.

Returning to FIG. 2, in some implementations, the mashup service subservice definition is stored in the MGS service repository 204 and is accessible through a mashup service repository provider 208 as part of a mashup service repository 210. In other implementations (as illustrated in FIG. 2), the mashup service repository provider can request the mashup service subservice definition from a separate storage location (here an XML file 212).

In some implementations, at runtime, a subservice factory 214 instantiates a mashup subservice 215 (by instantiating a processor 216 and EDM provider 218) based on information in the MGS service repository 204. In some implementations, an OData service is based on a processor (e.g., handling incoming requests) and a EDM provider (e.g., providing the data model of a service(s)). In some cases (e.g., custom services which differ from standard gateway-type OData services) the initialization of the processor 216 and EDM provider 218 need an additional input parameter or initialization steps. These initialization steps can be "hidden" in the subservice factories (e.g., 214 and specified in 410a)—for every custom service, a subservice factory has to be provided; for standard generic gateway-type services, there is also a generic subservice factory). The corresponding subservice factories are registered in the MGS service repository 204 and/or the mashup service repository 210. The mashup framework uses these factories for service instantiation in a standard way—there is no need for the framework to know anything about instantiation of a custom service, because the details are encapsulated in the corresponding subservice factory. The processor 216 and EDM provider 218 delegate requests to the corresponding counterpart of the identified subservices of the requested mashup service and perform combination actions to combine data returned from the subservices (e.g., if a service document request or a metadata request is made).

The mashup service repository provider 210 is instantiated during context initialization of a MGS instance 107 at deploy time. Additionally at deploy time, a gateway listener (not illustrated) instantiates the specified implementations of the mashup service repository provider 208 and registers the provider at a mashup services factory (not illustrated) during context initialization of a MGS instance. In typical implementations, the gateway listener is implemented in JAVA as a servlet.

The implementation is specified, for example, as a context parameter in an XML document as illustrated in FIG. 5. FIG. 5 illustrates an example parameter 500 in an XML document used to instantiate a mashup service repository provider 210 according to an implementation. The mashup service repository provider 208 is always initialized during context initialization (e.g., an application deployment on a cloud platform. From that point in time, the mashup service repository provider 208 is up and running until the cloud-based application is terminated). After the context initialization, the mashup service repository provider 208 is instantiated and registered with the mashup services factory 206. An incoming service request is always passed to the gateway listener first.

The gateway listener (or request preprocessing handler) identifies if the service request is related to a mashup service by utilizing the registered mashup service repository provider 203, which performs the mashup service repository 210 lookup. If the request is related to a mashup service, the mashup services factory 206 is called, which in turn instantiates the corresponding mashup processor 111a and mashup EDM provider 111b by utilizing the correct mashup service factory 206 defined in the mashup service repository 210 for this particular service. The mashup service factory 206 is part of the framework and instantiates the generic mashup provider 110 which is also part of the framework. The mashup provider 110 uses the registered subservice specific service factories 214 to instantiate the corresponding subservices needed to fulfill the incoming request. During request processing, the mashup provider 110 utilizes the mashup services factory to identify the subservices of the requested mashup service.

The following are examples of client requests to the example FLIGHT_MASHUP mashup service of FIG. 3 and returned data request result in OData format. The provided examples are only illustrating a particular implementation and are not meant to be limiting in any way.

For example, a client could request the metadata document from the FLIGHT_MASHUP service using the URL:

http://<server>:<port>/<trailing path segments>/
    CUSTOM/FLIGHT_MASHUP/$metadata.

Note that the URL uses the particular namespace 302 and external service name 304 to make a request to a particular mashup service. Returned metadata from this URL is a combination of the metadata documents provided by the example subservices 402a-c.

A client could likewise request data (e.g., a flight collection flight feed) from the FLIGHT_MASHUP service using the URL:

http://<server>:<port>/<trailing path segments>/
    CUSTOM/FLIGHT_MASHUP/FlightCollection
    $filter=carrid%20eq%20'LH'.

The URL . . . CUSTOM/FLIGHT_MASHUP/FlightCollection can be interpreted in the following way: The flight collection (or flight feed) is exposed by the sub-service FLIGHT of the mashup-service FLIGHT_MASHUP. The URL path segments defines the TOP level mashup service (FLIGHT_MASHUP) and then the collection/feed (FlightCollection). Note that actual collection (in this case FlightCollection) is not specified in the mashup service repository entry (FIG. 4) which specifies the sub-services of the mashup-service. The information regarding exposed feeds of a mashup service is identified during request processing. The generic mashup service provider 110 can identify a subservice responsible for providing a collection based on the data model of the mashup service. Thus, from the URL, the generic mashup service provider 110 knows that the FlightCollection is requested and from the metadata related to the mashup service FLIGHT_MASHUP (refer to FIGS. 7 and 8—the service document and metadata document is created during every request) the generic mashup service provider 110 knows that the corresponding subservice FLIGHT is responsible for providing this collection/feed. Note that this URL contains a filter to limit data to a particular carrier ID (here 'LH') otherwise all available data would be returned in response to the example URL (whether needed or not). It will be appreciated by those of ordinary skill in the art that there are a multitude of possible filters, limiting parameters, and/or query fields that could be used to limit/focus retrieve data in a query-type request (e.g., similar to a SQL query). Specific filters, parameters, etc. are decided by particular needs of a user.

In some implementations, users can also provide format strings to request data be returned in particular formats. For example, adding "$format=XML" or "$format=JSON" to a query string will return the appropriately requested format (XML or JSON) to the requestor if available.

The available feeds which are exposed by the FLIGHT_MASHUP service for a particular client (here with an identifier of "745") can also be retrieved with a URL similar to:

http://<server>:<port>/<trailing path segments>/
    CUSTOM/ FLIGHT_MASHUP/$client=745.

Note that the request for a single read (providing for a particular single entity—in this case client=747) would be structured differently. In some implementations, the request could be similar to:

http://<server>:<port>/<trailing path segments>/
    CUSTOM/FLIGHT_MASHUP/ClientCollection(747)

in a case where a ClientCollection is modeled for the flight-mashup service). If interested in a particular Flight from a FlightCollection, the request can look as follows:

```
http://<server>:<port>>/<trailing path segments>/
    CUSTOM/FLIGHT_MASHUP/FlightCollection(carrid='LH',
    connid='0400',fldate=datetime'2012-07-21T00%3A00%3A00').
```

FIG. 6 is a block diagram 600 of an exemplary computer 602 used in the EDCS 100 according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 602 may comprise a computer that includes an input device, such as a keypad, keyboard, touch screen, or other device that can accept user information, and an output device that conveys information associated with the operation of the computer 602, including digital data, visual and/or audio information, or a GUI.

The computer 602 can serve as a client, for example client 102 and/or a server, for example executing virtual MGS instances 107 in a cloud-based computing environment. The computer 602 can also serve as a computer for a database or other persistency (e.g., the MGS service repository 204), customer system 112, an external cloud service 114, and/or any other component of the EDCS 100. The illustrated computer 602 is communicably coupled with a network 630. In some implementations, one or more components of the computer 602 may be configured to operate within a cloud-computing-based environment.

At a high level, the computer 602 is an electronic computing device operable to receive, transmit, process, store, or manage data and information associated with the EDCS 100. According to some implementations, the computer 602 may also include or be communicably coupled with an application server, e-mail server, web server, caching server, streaming data server, business intelligence (BI) server, and/or other server.

The computer 602 can receive requests over network 630 from a client application (e.g., executing on another computer 602) and responding to the received requests by processing the said requests in an appropriate software application. In addition, requests may also be sent to the computer 602 from internal users (e.g., from a command console or by other appropriate access method), external or third-parties, other automated applications, as well as any other appropriate entities, individuals, systems, or computers.

Each of the components of the computer 602 can communicate using a system bus 603. In some implementations, any and/or all the components of the computer 602, both hardware and/or software, may interface with each other and/or the interface 604 over the system bus 603 using an application programming interface (API) 612 and/or a service layer 613. The API 612 may include specifications for routines, data structures, and object classes. The API 612 may be either computer-language independent or dependent and refer to a complete interface, a single function, or even a set of APIs. The service layer 613 provides software services to the computer 602 and/or the EDCS 100. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or other suitable format.

While illustrated as an integrated component of the computer 602, alternative implementations may illustrate the API 612 and/or the service layer 613 as stand-alone components in relation to other components of the computer 602 and/or EDCS 100. Moreover, any or all parts of the API 612 and/or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602 and/or EDCS 100. The interface 604 is used by the computer 602 for communicating with other systems in a distributed environment—including within the EDCS 100—connected to the network 630 (whether illustrated or not). Generally, the interface 604 comprises logic encoded in software and/or hardware in a suitable combination and operable to communicate with the network 630. More specifically, the interface 604 may comprise software supporting one or more communication protocols associated with communications such that the network 630 or interface's hardware is operable to communicate physical signals within and outside of the illustrated EDCS 100.

The computer 602 includes a processor 605. Although illustrated as a single processor 605 in FIG. 6, two or more processors may be used according to particular needs, desires, or particular implementations of the computer 602 and/or the EDCS 100. Generally, the processor 605 executes instructions and manipulates data to perform the operations of the computer 602. Specifically, the processor 605 executes the functionality required to provide cloud-based, generic OData mashup services.

The computer 602 also includes a memory 606 that holds data for the computer 602 and/or other components of the EDCS 100. Although illustrated as a single memory 606 in FIG. 6, two or more memories may be used according to particular needs, desires, or particular implementations of the computer 602 and/or the EDCS 100. While memory 606 is illustrated as an integral component of the computer 602, in alternative implementations, memory 606 can be external to the computer 602 and/or the EDCS 100.

The application 607 is an algorithmic software engine providing functionality according to particular needs, desires, or particular implementations of the computer 602 and/or the EDCS 100, particularly with respect to functionality required to provide cloud-based, generic OData mashup services. For example, application 607 can serve as the MGS core runtime 202, a mashup service repository provider 208, a mashup provider 110 runtime, and/or other application associated with the computer 602 and/or the EDCS 100. Further, although illustrated as a single application 607, the application 607 may be implemented as multiple applications 607 on the computer 602. In addition, although illustrated as integral to the computer 602, in alternative implementations, the application 607 can be external to the computer 602 and/or the EDCS 100.

There may be any number of computers 602 associated with, or external to, the EDCS 100 and communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Figure 7:
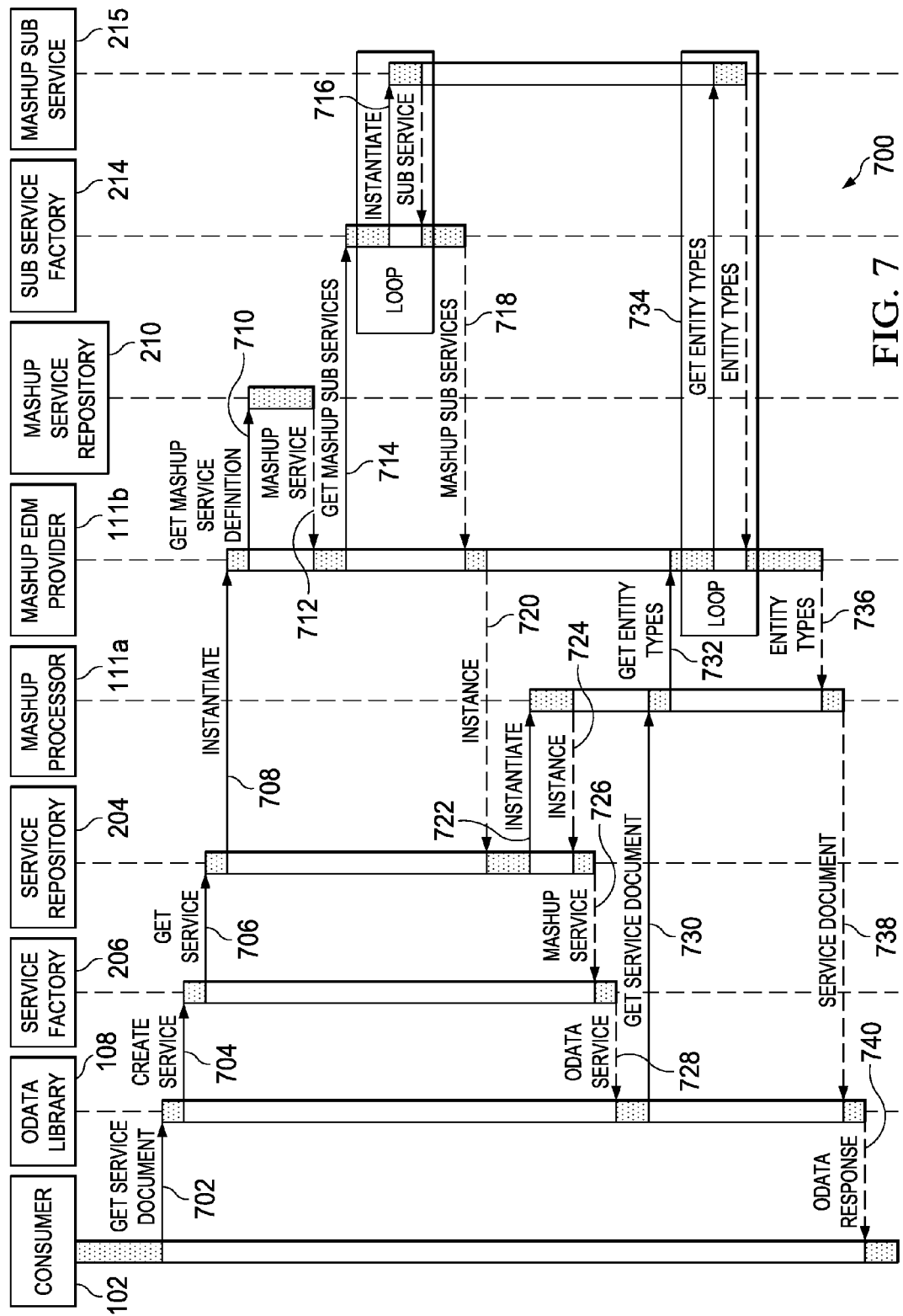
FIG. 7 is a sequence diagram illustrating a method for processing a request for a service document according to an implementation.

FIG. 7 is a sequence diagram illustrating a method 700 for processing a request for a service document according to an implementation. For clarity of presentation, the description that follows generally describes method 700 in the context of FIGS. 1-6. However, it will be understood that method 700 may be performed, for example, by any other suitable system, environment, software, and hardware, or a combination of systems, environments, software, and hardware as appropriate. In some implementations, various steps of method 700 can be run in parallel, in combination, in loops, or in any order.

At 702, a request is received by the OData library from a consumer to get a service document. The OData library is utilized by the MGS framework to do OData related processing—e.g., in some implementations, URL parsing and serialization of the request results to either XML or JSON. From 702, method 700 proceeds to 704.

At 704, the OData library transmits a request to the service factory to create an OData service to provide a service document associated with the mashup service that is the subject of the service document request. From 704, method 700 proceeds to 706.

At 706, the service factory transmits a request to the service repository to retrieve the mashup service that is the subject of the service document request. From 706, method 700 proceeds to 708.

At 708, the service repository transmits a request to the generic mashup EDM provider of the framework to instantiate the corresponding mashup service. From 708, method 700 proceeds to 710.

At 710, the mashup EDM provider transmits a request to the mashup service repository for a mashup service definition. From 710, method 700 proceeds to 712.

At 712, the mashup service definition is then returned to the mashup EDM provider. From 712, method 700 proceeds to 714.

At 714, the mashup EDM provider transmits a request to the subservice factory to retrieve subservice definitions for subservices associated with the mashup service. From 714, method 700 proceeds to 716.

At 716, the subservice factory runs in a loop to instantiate all subservices associated with the mashup service. From 716, method 700 proceeds to 718.

At 718, a list of instantiated subservices is transmitted to the mashup EDM provider. From 718, method 700 proceeds to 720.

At 720, the instantiated instance of the mashup service (including subservices) is transmitted to the service repository. From 720, method 700 proceeds to 722.

At 722, the service repository transmits a request to the mashup processor to instantiate. From 722, method 700 proceeds to 724.

At 724, the instantiated instance of the mashup processor is transmitted to the service repository. From 724, method 700 proceeds to 726.

At 726, the created mashup service is transmitted to the service factory. From 726, method 700 proceeds to 728.

At 728, the service factory returns a created OData service to the OData library. From 728, method 700 proceeds to 730.

At 730, the OData library transmits an OData request to the mashup processor for the service document. For example, the service document can be requested by an HTTP-call:

http://<servername>:port/<trailing-path-segments>/<servicename>.

The OData library would utilize the mashup EDM provider to retrieve information about the collections (feeds) provided by the particular service and then render an XML document which lists the exposed collections of the service. Note that in the sequence diagrams of both FIG. 7 and FIG. 8, one collection (or feed) corresponds to an entity type. The entity type specifies the data structure of the entries of one collection (the data model of the entities). From 730, method 700 proceeds to 732.

At 732, the mashup processor request data structure entity types from the mashup EDM provider for the complete mashup service (and subservices). From 732, method 700 proceeds to 734.

At 734, the mashup EDM provider runs in a loop to retrieve entity types from the mashup sub service. From 734, method 700 proceeds to 736.

At 736, the mashup EDM provider returns the entity types retrieved from the mashup sub service. From 736, method 700 proceeds to 738.

From 738, the mashup processor formats the service document for the mashup service using the returned entity types and transmits it to the OData library. From 738, method 700 proceeds to 740.

From 740, the OData library transmits the requested service document for the mashup service to the consumer. From 740, method 700 stops.

Figure 8:
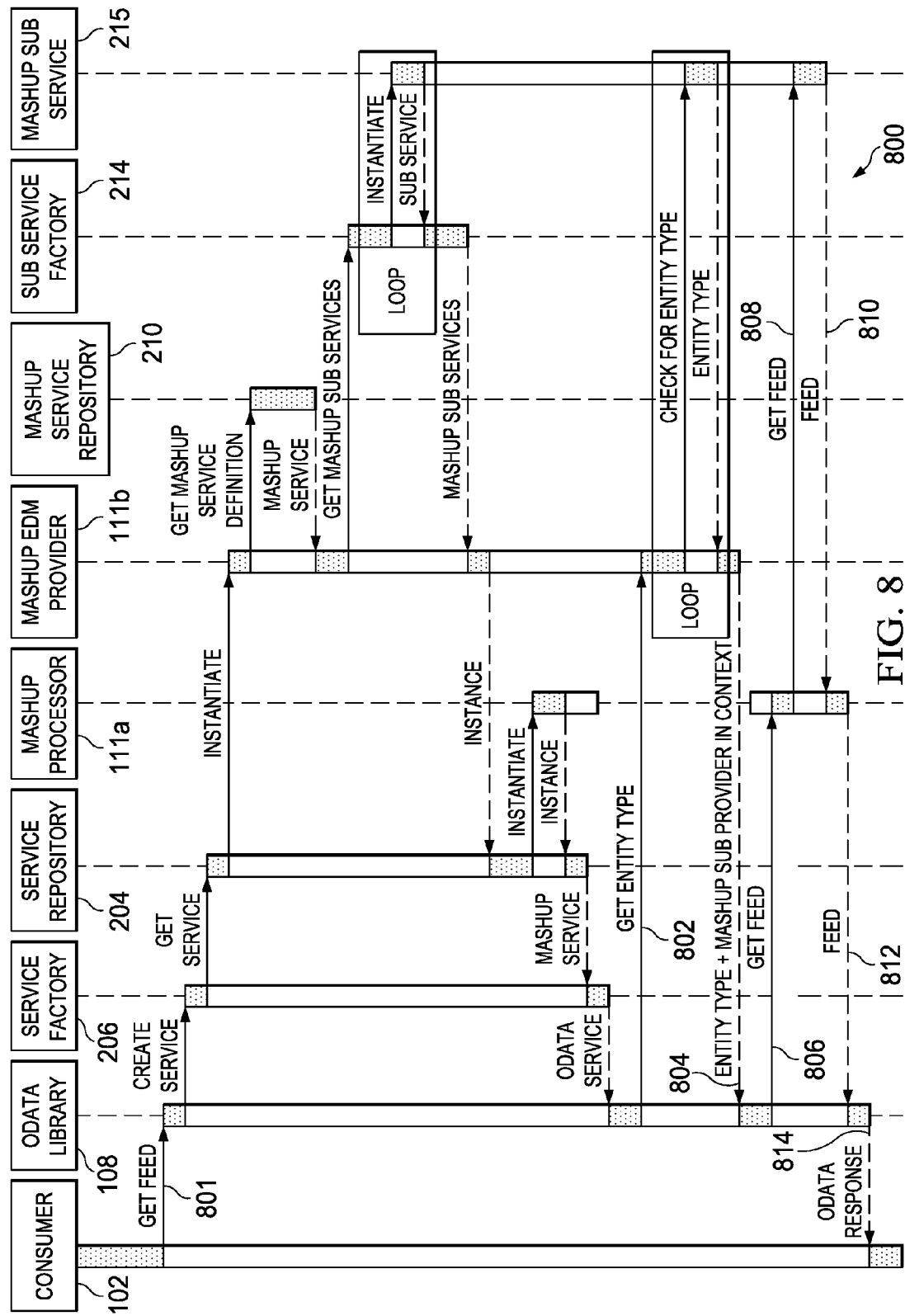
FIG. 8 is a sequence diagram illustrating a method for processing a read feed request according to an implementation.

FIG. 8 is a sequence diagram illustrating a method 800 for processing a read feed request according to an implementation. For clarity of presentation, the description that follows generally describes method 800 in the context of FIGS. 1-7. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, or in any order. Note that the difference between method 700 and 800 starts at 802. Prior steps should be assumed to identical to 704-734 as described in FIG. 7. Note that the first steps during request processing are the same for all request types (e.g., service document, metadata, feed, etc.). The metadata related to a request is retrieved from the registered subservices in order to detect which subservice is addressed by a particular feed request (or single entity read). As such, the upper portions of FIG. 7 and FIG. 8 are substantially similar.

A read feed is a request for a "feed" (or collection) of data. For example, a list of products, a list of orders, a list of flights, etc.) The service document of an OData service specifies the collections (feeds) which can be exposed by an OData service. The request for a particular collection (feed) would be similar to:

http://<servername>:port/<trailing-path-segments>/<servicename>/<collection-name>

For example, if a service FLIGHT exposes collections CARRIERS and BOOKINGS, the request:

http://<servername>:port/<trailing-path-segments>/FLIGHT/CARRIERS would provide a list with all available carriers. Similarly, the request:

http://<servername>:port/<trailing-path-segments>/FLIGHT/BOOKINGS would provide a list with all bookings in the system.

At 801, a request is received by the OData library from a consumer to get a feed (collection) exposed by a mashup service. Note that methods 700 and 800 are identical apart from 801 and from 802 onward. Other steps in FIG. 8 should be assumed to identical to 704-734 as described in FIG. 7.

At 802, the OData library transmits an OData request to the mashup EDM provider for entity types (returned as entries in a metadata document). For example, one entity type can describe the data model of a feed-entry (collection entry), such as an entity type specifying a data model of one entity in a flight-collection (feed) requested from the FLIGHT-MASHUP service described above.

At 804, the mashup EDM provider transmits the entity types retrieved from the mashup subservices by utilizing the registered mashup sub providers. From 804, method 800 proceeds to 806.

At 806, the OData library forwards a request to the mashup processor to retrieve a particular feed. From 806, method 800 proceeds to 808.

At 808, the mashup processor delegates the feed request to the corresponding mashup sub-service to get the feed. From 808, method 800 proceeds to 810.

At 810, the mashup sub-service utilizes the mashup processor to get the feed. From 810, method 800 proceeds to 812.

At 812, the mashup processor returns the feed information (collection) to the OData library. From 812, method 800 proceeds to 814.

From 814, the OData library creates the corresponding read feed response (e.g., XML, JSON, etc.) based on the runtime data and the service data model (metadata) retrieved during the first portion of the request processing in FIG. 8 for the requested feed for the mashup service to the consumer. From 814, method 800 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/ or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
parsing a received request for service-related data to generate a lookup key used to determine a subject mashup service to service the request;
retrieving a subject mashup service definition from an entry in a service repository, wherein the mashup service definition is identified using the lookup key which includes a namespace, a service name, and a service version;
retrieving a generic mashup service provider registered in the service repository entry;
identifying, using the generic mashup service provider, a mashup subservice factory needed for instantiation and initialization of a generic entity data model (EDM) provider used to instantiate the subject mashup service;
retrieving, using the generic mashup service provider, subservice definitions of subservices associated with the subject mashup service definition;
instantiating, using a computer and the mashup subservice factory, subservices using the subservice definitions; and
transmitting a request to the generic mashup service provider to retrieve the service-related data from the instantiated subservices.

2. The method of claim 1, comprising instantiating the subject mashup service using the generic EDM provider.

3. The method of claim 2, further comprising the generic EDM provider transmitting a request to a mashup service repository for a service definition of the subject mashup service.

4. The method of claim 1, further comprising formatting a service document responsive to the request for service related data, the service document formatted from entity types returned in response to the request to retrieve the service-related data from the instantiated sub services.

5. The method of claim 1, further comprising instantiating a mashup processor following the instantiation of the subservices associated with the subject mashup service.

6. The method of claim 5, further comprising transmitting a request to the mashup processor for a read feed using a received entity type returned in response to the request to retrieve the service-related data from the instantiated subservices.

7. The method of claim 6, further comprising creating a read feed response responsive to the request for service-related data.

8. A non-transitory, computer-readable medium storing computer-readable instructions executable by a computer and operable to:
parse a received request for service-related data to generate a lookup key used to determine a subject mashup service to service the request;
retrieve a subject mashup service definition from an entry in a service repository, wherein the mashup service definition is identified using the lookup key which includes a namespace, a service name, and a service version;
retrieve a generic mashup service provider registered in the service repository entry;
identify, using the generic mashup service provider, a mashup subservice factory needed for instantiation and initialization of a generic entity data model (EDM) provider used to instantiate the subject mashup service;
retrieve, using the generic mashup service provider, subservice definitions of subservices associated with the subject mashup service definition;
instantiate, using the mashup subservice factory, subservices using the subservice definitions; and
transmit a request to the generic mashup service provider to retrieve the service-related data from the instantiated subservices.

9. The medium of claim 8, comprising computer-readable instructions to instantiate the subject mashup service using the generic EDM provider.

10. The medium of claim 9, further comprising instructions operable to instruct the generic EDM provider to transmit a request to a mashup service repository for a service definition of the subject mashup service.

11. The medium of claim 8, further comprising instructions operable to format a service document responsive to the request for service related data, the service document formatted from entity types returned in response to the request to retrieve the service-related data from the instantiated subservices.

12. The medium of claim 8, further comprising instructions operable to instantiate a mashup processor following the instantiation of the subservices associated with the subject mashup service.

13. The medium of claim 12, further comprising instructions operable to transmit a request to the mashup processor for a read feed using a received entity type returned in response to the request to retrieve the service-related data from the instantiated subservices.

14. The medium of claim 13, further comprising instructions operable to create a read feed response responsive to the request for service-related data.

15. A system, comprising:
a memory;
at least one computer interoperably coupled with the memory and configured to:
parse a received request for service-related data to generate a lookup key used to determine a subject mashup service to service the request;
retrieve a subject mashup service definition from an entry in a service repository, wherein the mashup service definition is identified using the lookup key which includes a namespace, a service name, and a service version;
retrieve a generic mashup service provider registered in the service repository entry;
identify, using the generic mashup service provider, a mashup subservice factory needed for instantiation and initialization of a generic entity data model (EDM) provider used to instantiate the subject mashup service;
retrieve, using the generic mashup service provider, subservice definitions of subservices associated with the subject mashup service definition;
instantiate, using the mashup subservice factory, subservices using the subservice definitions; and
transmit a request to the generic mashup service provider to retrieve the service-related data from the instantiated subservices.

16. The system of claim 15, configured to instantiate the subject mashup service using the generic EDM provider.

17. The system of claim 16, further configured to instruct the generic EDM provider to transmit a request to a mashup service repository for a service definition of the subject mashup service.

18. The system of claim 15, further configured to format a service document responsive to the request for service related data, the service document formatted from entity types returned in response to the request to retrieve the service-related data from the instantiated sub services.

19. The system of claim 15, further configured to instantiate a mashup processor following the instantiation of the subservices associated with the subject mashup service.

20. The system of claim 19, further configured to transmit a request to the mashup processor for a read feed using a received entity type returned in response to the request to retrieve the service-related data from the instantiated subservices.

21. The system of claim 20, further configured to create a read feed response responsive to the request for service-related data.

* * * * *